US007262825B2

(12) United States Patent
Lee

(10) Patent No.: US 7,262,825 B2
(45) Date of Patent: Aug. 28, 2007

(54) LIQUID CRYSTAL CELL PROCESS FOR CIRCULAR ELECTRODE IN-PLANE SWITCHING MODE LIQUID CRYSTAL DISPLAY DEVICE AND SAID DEVICE

(75) Inventor: Yun-Bok Lee, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 71 days.

(21) Appl. No.: 10/824,446

(22) Filed: Apr. 15, 2004

(65) Prior Publication Data

US 2005/0128404 A1    Jun. 16, 2005

(30) Foreign Application Priority Data

Dec. 11, 2003    (KR) ............... 10-2003-0090360

(51) Int. Cl.
*G02F 1/1343* (2006.01)

(52) U.S. Cl. ..................................... 349/141

(58) Field of Classification Search ............... 349/123, 349/129, 141
See application file for complete search history.

(56) References Cited

U.S. PATENT DOCUMENTS

| 5,069,813 | A |   | 12/1991 | Patel ................ 252/299.01 |
| 5,434,687 | A |   | 7/1995 | Kawata et al. ............ 349/96 |
| 5,610,743 | A |   | 3/1997 | Tsai et al. ................ 349/124 |
| 5,879,497 | A | * | 3/1999 | Nakahara et al. .......... 156/99 |
| 5,977,562 | A | * | 11/1999 | Hirakata et al. ........... 257/72 |
| 6,191,881 | B1 | * | 2/2001 | Tajima ..................... 359/254 |
| 6,243,154 | B1 |   | 6/2001 | You et al. ................ 349/141 |
| 6,313,897 | B1 | * | 11/2001 | Murayama et al. ........ 349/126 |
| 6,512,563 | B1 | * | 1/2003 | Tajima .................... 349/123 |
| 7,177,001 | B2 | * | 2/2007 | Lee ........................ 349/141 |
| 2003/0053020 | A1 |   | 3/2003 | Okada et al. ............ 349/139 |
| 2003/0168055 | A1 |   | 9/2003 | Chae ..................... 125/23.01 |

FOREIGN PATENT DOCUMENTS

| CN | 1444082 | 9/2003 |
| EP | 1 300 721 A2 | 4/2003 |

(Continued)

*Primary Examiner*—David Nelms
*Assistant Examiner*—Timothy L. Rude
(74) *Attorney, Agent, or Firm*—Morgan, Lewis & Bockius LLP

(57) ABSTRACT

A process for forming an in-plane switching liquid crystal display device includes: defining a first liquid crystal cell area that has a first size and a second liquid crystal cell area that has a second size on a first bare glass, wherein first longer sides of the first liquid crystal cell area run in a first direction on the first bare glass and second longer sides of the second liquid crystal cell areas run in a second direction; forming array elements that include thin film transistors, common electrodes and pixel electrodes within the first and second liquid crystal cell areas of the first bare glass, wherein the common electrodes and pixel electrodes define concentric ring-shaped apertures; rubbing the first bare glass having the array elements in a first rubbing direction; forming a color filter layer on a second bare glass wherein liquid crystal cell areas corresponding in size to the first and second liquid crystal cell areas are defined; and rubbing the second bare glass having the color filter in a second rubbing direction opposite to the first rubbing direction.

20 Claims, 8 Drawing Sheets

FOREIGN PATENT DOCUMENTS

| | | |
|---|---|---|
| JP | 52-15332 | 2/1977 |
| JP | 52-119329 | 10/1977 |
| JP | 53-45544 | 4/1978 |
| JP | 54-145546 | 11/1979 |
| JP | 60-3609 | 1/1985 |
| JP | 62-240926 | 10/1987 |
| JP | 9-265062 | 10/1997 |
| JP | 09-325328 | 12/1997 |
| JP | 9-325340 | 12/1997 |
| JP | 10-107289 | 4/1998 |
| KR | 1999-0058889 | 7/1999 |
| KR | 2001-0005217 | 1/2001 |

\* cited by examiner

LIQUID CRYSTAL CELL PROCESS FOR CIRCULAR ELECTRODE IN-PLANE SWITCHING MODE LIQUID CRYSTAL DISPLAY DEVICE AND SAID DEVICE

This application claims the benefit of Korean Patent Application No. 2003-090360, filed on Dec. 11, 2003, which is hereby incorporated by reference.

BACKGROUND OF THE INVENTION

1. Field of the Invention

The present invention relates to liquid crystal display devices. More particularly it relates to liquid crystal display devices implenting in-plane switching (IPS) where an electric field to be applied to liquid crystals is generated in a plane parallel to a substrate.

2. Discussion of the Related Art

A liquid crystal display device uses the optical anisotropy and polarization properties of liquid crystal molecules to produce an image. The long thin shapes of the liquid crystal can be aligned to have an orientation in a specific direction. The alignment direction of the liquid crystals can be controlled by an applied electric field. In other words, as an applied electric field changes, so does the alignment of the liquid crystal molecules. Due to the optical anisotropy of the liquid crystal, the refraction of incident light depends on the alignment direction of the liquid crystal molecules. Thus, by properly controlling an electric field applied to a group of liquid crystal molecules in respective pixels, a desired image can be produced by diffracting light.

There are many types liquid crystal displays (LCDs). One type of LCD is an active matrix LCD (AM-LCD) that has a matrix of pixels. Each of the pixels in an AM-LCD has a thin film transistor (TFT) and a pixel electrode. AM-LCDs are the subject of significant research and development because of their high resolution and superiority in displaying moving images.

LCD devices have wide applications in office automation (OA) equipment and video units because they have the characteristics of light weight, thin profile and low power consumption. The typical liquid crystal display panel of an LCD device has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors, and pixel electrodes.

The operation of an LCD device is based on the principle that the alignment direction of the liquid crystal molecules is dependent upon an electric field applied between the common electrode and the pixel electrode. More particularly, the alignment direction of the liquid crystal molecules is controlled by the application of an electric field to the liquid crystal layer. When the alignment direction of liquid crystal molecules is properly controlled in each pixel of a group of pixels, incident light is refracted along the alignment direction in a plurality of pixels to display image data. Thus, liquid crystal molecules in the pixels function as an optical modulation element having variable optical characteristics that depend upon the polarity of the applied voltage.

FIG. 1 is a partial perspective view illustrating a related art active matrix LCD device. As shown in FIG. 1, the LCD device includes an upper substrate 10 and a lower substrate 30 that are spaced apart from each other, and a liquid crystal layer 50 is interposed therebetween. The upper substrate 10 and the lower substrate 30 are often referred to as a color filter substrate and an array substrate, respectively. A common electrode 22 and a pixel electrode 24 are located on the lower substrate 20. On the lower substrate 30, a plurality of gate lines 32 and data lines 34 are perpendicularly positioned with respect to each other such that pairs of the crossing gate lines 32 and data lines 34 define pixel regions P. The thin film transistors T are formed adjacent to a corner in each of the respective pixel regions P. A pixel electrode 46 is formed in each of the respective pixel regions that is electrically connected to the thin film transistor T of the pixel region. Although not shown in FIG. 1, each thin film transistor T includes a gate electrode for receiving signal voltages from the gate line 32, a source electrode for receiving a data voltage from the data line 34, a drain electrode for transferring the data voltage to the pixel electrode 46, and a channel that can be turned-on and turned-off via a voltage applied to gate electrode. The pixel electrode 46 is usually formed of a transparent conductive material, such as indium tin oxide (ITO) or indium zinc oxide (IZO).

The upper substrate 10 includes a color filter layer 12 and a common electrode that are sequentially formed on the inner surface of the upper substrate 10 that faces the lower substrate 30. Although not shown in FIG. 12, the color filter layer 12 includes color filters that transmit corresponding wavelengths of light and a black matrix shielding the light in the color filter borders. The common electrode 16 is usually formed of a transparent conductive material, such as indium tin oxide (ITO) or indium zinc oxide (IZO).

On the outer surfaces of the upper substrate 10 and the lower substrate 30, an upper polarizer 52 and a lower polarizer 54 are respectively formed thereon. A backlight generating light is disposed underneath the lower polarizer 54.

The above-mentioned active matrix liquid crystal display device is commonly formed throughout a liquid crystal cell process that includes an array fabrication, a color filter fabrication and a liquid crystal injection between the array and color filter substrates. The array fabricating process includes forming the switching elements, e.g., the thin film transistors, and forming the pixel electrodes. The color filter fabricating process includes forming the color filter layer and forming the common electrode. Additionally, the liquid crystal injection process includes a panel fabrication process for attaching the color filter substrate to the array substrate and injecting the liquid crystals into a gap between the color filter substrate and the array substrate.

The panel fabrication process is much simpler than the array substrate and color filter substrate fabricating process because it does not require repeated patterning processes. Further, the panel fabrication process includes forming alignment layers on the inner surfaces of the substrates, forming a cell gap, cutting the substrates into a cell, and injecting liquid crystals. Accordingly, the liquid crystal cell process finally forms a liquid crystal panel for a liquid crystal display.

FIG. 2 is a plan view illustrating a liquid crystal cell arrangement on a bare glass. As shown, a cell area IIa and a dummy area IIb are defined on a bare glass 60. The cell area IIa is surrounded by the dummy area IIb, and it becomes a liquid crystal cell after the cutting process. The cell area IIa is divided into a first area 62 and a second area 64, as shown in FIG. 2, and the second area 64 is disposed in peripheries of the cell area IIa. Although not shown in FIG. 2, a plurality of array elements are formed in the first area 62. During the cutting process after injecting the liquid crystals in the cell area IIa, the bare glass 60 is cropped to remove the dummy cell area IIb. Although only one cell area is shown in FIG. 2, a lot of cell areas can be disposed on the bare glass 60 with an adequate arrangement. Further, the bare glass can be formed of plastic and acts as a base substrate in the liquid crystal panel.

The liquid crystal cells can be adopted in various kind of display devices, and the size of the liquid crystal cell can be various depending on the display device. Therefore, it is very important to properly arrange the liquid crystal cells on the bare glass in order to reduce the dummy area. If the dummy area increases, it will be waste of cost and material.

To overcome the above disadvantage, an MMG (Multi-Model on Glass) type arrangement, which efficiently arranges large-sized liquid crystal cells and small-sized liquid crystal cells on the bare glass, is adopted to effectively utilize the bare glass space. FIG. 3 is a diagram illustrating an MMG type arrangement of the liquid crystal cells for use in fabricating a TN (twisted nematic) mode liquid crystal display device according to a related art.

As shown in FIG. 3, a plurality of first cell areas IIIa and a plurality of second cell areas IIIb are disposed on a bare glass 66 with being spaced apart from one another. Each of the first cell areas IIIa has a first size, while each of the second cell areas IIIb has a second size. When arranging the first and second cell areas IIIa and IIIb on the bare glass 66, it is very important to utilize the space effectively.

In the TN mode liquid crystal display device, a rubbing process is applied to the bare glass 66 for the purpose of inducing the initial arrangement of liquid crystals. At this time, the rubbing directions respectively applied to the upper and lower substrates are perpendicular to each other. Namely, a first rubbing direction r1 applied to the lower bare glass is perpendicular to a second rubbing direction r2 applied to the upper bare glass, as shown in FIG. 3. The first rubbing direction r1 is substantially 45 degrees and is adopted in the lower substrate of the liquid crystal panel. And the second rubbing direction r2 is substantially 135 degrees and is adopted in the upper substrate of the liquid crystal panel.

The viewing angle properties are determined depending on the alignment direction of the TN liquid crystals. Since the rubbing process is applied to the bare glass, the liquid crystal cells on the bare glass have the same rubbing direction. However, since the liquid crystal cell areas are arranged longitudinally to let the widths be parallel when the liquid crystal cells having different sizes, for example, the first and second liquid crystal cell areas IIIa and IIIb, are disposed on the same bare glass, there may be some limitation in arranging liquid crystal cells on the bare glass or in utilizing the space of the bare glass efficiently.

In a conventional LCD device, since the pixel and common electrodes are positioned on the lower and upper substrates, respectively, the electric field induced between them is perpendicular to both the lower and upper substrates. However, the conventional LCD devices having the longitudinal electric field have a drawback in that they have a very narrow viewing angle. In order to solve the problem of narrow viewing angle, in-plane switching liquid crystal display (IPS-LCD) devices have been proposed. The IPS-LCD devices typically include a lower substrate where a pixel electrode and a common electrode are disposed, an upper substrate having no electrode, and a liquid crystal interposed between the upper and lower substrates. A detailed explanation about operation modes of a typical IPS-LCD panel will be provided referring to FIG. 1.

FIG. 4 is a cross-sectional view illustrating the concept of a related art IPS-LCD panel. As shown in FIG. 4, upper and lower substrates 80 and 70 are spaced apart from each other, and a liquid crystal layer 90 is interposed therebetween. The upper substrate 80 and the lower substrate 70 are often referred to as an array substrate and a color filter substrate, respectively. On the lower substrate 70, a common electrode 72 and the pixel electrode 74 are positioned to be spaced apart from one another. The common electrode 72 and the pixel electrode 74 are parallel to each other. On the surface of the upper substrate 80, a color filter layer (not shown) is commonly positioned in a position between the pixel electrode 74 and the common electrode 72 of the lower substrate 70. A voltage applied across the common electrode 72 and the pixel electrode 74 produces an electric field E through the liquid crystal layer 90. Liquid crystals 92 have a positive dielectric anisotropy, and thus they align so as to be parallel to the electric field E. The result is a wide viewing angle that ranges from about 80 to 85 degrees in up-and-down and left-and-right sides from a line vertical to the IPS-LCD panel, for example.

FIG. 5A is a plan view illustrating one pixel of an array substrate where straight pixel and common electrodes are disposed according to a related art IPS-LCD device, and FIG. 5B is a plan view illustrating one pixel of an array substrate where zigzag pixel and common electrodes are disposed according to another related are IPS-LCD device. As shown in FIGS. 5A and 5B, gate lines GL are transversely arranged across the figures and data lines DL are disposed substantially perpendicular to the gate lines GL. Common line CL runs in parallel with the gate lines GL and are spaced apart from each of the gate lines GL. The gate lines GL, the common line CL and a pair of the data lines DL define a pixel region P on the array substrate. A thin film transistor (TFT) T is disposed adjacent a corner of the pixel region P where one of the gate lines GL and one of the data lines cross.

Referring to FIG. 5A, three common electrodes 94 extend perpendicularly from the common line CL in each pixel region P. Among the three common electrodes 94, two common electrodes 94 are disposed next to the data lines DL, respectively. A pixel connecting line 95 is disposed next to the gate line GL on the side of the pixel P opposite to the common line CL. The pixel connecting line 95 is electrically connected to the TFT T parallel with the gate line GL. Pixel electrodes 96 extend perpendicularly from the pixel connecting line 95. Each of the pixel electrodes 96 is disposed between two of the common electrodes 94 and are parallel with the data line DL. Each of areas "AA" between one of the respective common electrodes 94 and one of the respective pixel electrodes 96 is defined as a block where the liquid crystal molecules are re-arranged by electric fields. In FIG. 5A, there are four blocks in one pixel region P. The area "AA" is often referred to as an aperture area.

As shown in FIG. 5B, the common and pixel electrodes are shaped in zigzag to accomplish multiple domains along the length of the electrodes. Some detailed explanations, especially those previously explained in reference to FIG. 5A, will be omitted with regard to FIG. 5B to prevent duplicate explanations. A pixel connecting line PL is disposed over a common line CL in FIG. 5B. Common electrodes 97 and pixel electrodes 98 are extended from the common and pixel connecting lines CL and PL, respectively, in an up-and-down direction. Both the common electrodes 97 and the pixel electrodes 98 have a zigzag shape with plural bent portions that alternate with each other. However, corresponding portions of the common electrodes 97 and the pixel electrodes 98 are parallel to each other. The zigzag shape defines the multiple domains in the pixel regions that are symmetrical to the bent portions of the common electrodes 97 and the pixel electrode 98. This zigzag shape with multiple domains further improves the viewing angle as compared to the straight shape shown in FIG. 5A. Also in FIG. 5B, each of areas "AA" defined between the respective common electrodes 97 and the respective pixel electrodes 98 can be denoted as a block where the liquid crystal molecules are re-arranged by the electric fields. In FIG. 5B, there are also four blocks in one pixel region P.

As shown in FIGS. 5A and 5B, the IPS-LCD devices according to the related arts re-arrange and orient the liquid crystal molecules using electric fields that are parallel with the array substrate. Thus, they can provide a wide viewing angle as opposed to an LCD device that uses electric fields perpendicular to the array substrate.

Rubbing processes are applied to the above-mentioned array substrates to induce an initial orientation of the liquid crystal molecules. As shown in FIG. 5A, the rubbing process is performed along a rubbing direction "RD" that forms a certain angle with the straight common electrodes 94 and pixel electrodes 96. The reason for the inclined rubbing direction with respect to the common electrodes 94 and pixel electrodes is to obtain a fast re-arrangement of the liquid crystals in correspondence with the electric field. In FIG. 5B, a rubbing direction "RD" is parallel with the data lines DL because the common electrodes 97 and the pixel electrodes 98 have a zigzag shape.

FIG. 6 is a diagram illustrating an arrangement of liquid crystal cells for use in fabricating an IPS-LCE device in accordance with the related art. As shown in FIG. 6, the rubbing direction is determined depending on whether the IPS-LCD has the straight or zigzag-shaped electrodes. As illustrated with reference to FIGS. 5A and 6, if the straight electrode pattern is used, the rubbing direction should be inclined with a certain angle to the straight electrodes such that a rubbing direction RD2 is applied to the upper substrate and an opposite rubbing direction RD1 is applied to the lower substrate. Moreover, as shown in FIGS. 5B and 6, if the zigzag-shaped electrodes are adopted, the rubbing direction should be parallel with the data lines DL, for example, 90 or 270 degrees such that a rubbing direction RD'2 applied to the upper substrate is opposite to the rubbing direction RD'1 applied to the lower substrate.

On the bare glass 99, it is possible to arrange different-sized liquid crystal cells VIa and VIb, for example, 30 inches and 15 inches. When forming the four 30 inches liquid crystal cells VIa and the three 15 inches liquid crystal cells VIb as shown in FIG. 6, widths W1 and W2 of those liquid crystal cells VIa and VIb should be arranged in the same direction because of the rubbing direction applied to the bare glass. Namely, the liquid crystal cells VIa and VIb let the widths W1 and W2 be arranged horizontally. If the 15 inches liquid crystal cells VIb are disposed to let the width W2 be arranged vertically, those 15 inches liquid crystal cells VIb may malfunction because the rubbing direction applied to the bare glass is substantially perpendicular to the electrodes unlike the rubbing direction shown in FIGS. 5A and 5B. Accordingly, there are some limitations in arranging the liquid crystal cells on the bare glass.

SUMMARY OF THE INVENTION

Accordingly, the present invention is directed to a liquid crystal cell process for an IPS-LCD device that substantially obviates one or more of the problems due to limitations and disadvantages of the related art.

An advantage of the present invention is to provide a liquid crystal cell process for use in an IPS-LCD device to increases the efficiency of using bare glass.

Another advantage of the present invention is to provide an array substrate for use in an IPS-LCD device to provide uniform liquid crystal directors in all directions.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages, an embodiment in accordance with the principles of the present invention provides a liquid crystal cell process for use in an in-plane switching liquid crystal display device. A process for forming an in-plane switching liquid crystal display device includes: defining a first liquid crystal cell area that has a first size and a second liquid crystal cell area that has a second size on a first bare glass, wherein first longer sides of the first liquid crystal cell area run in a first direction on the first bare glass and second longer sides of the second liquid crystal cell areas run in a second direction; forming array elements that include thin film transistors, common electrodes and pixel electrodes within the first and second liquid crystal cell areas of the first bare glass, wherein the common electrodes and pixel electrodes define concentric ring-shaped apertures; rubbing the first bare glass having the array elements in a first rubbing direction; forming a color filter layer on a second bare glass wherein liquid crystal cell areas corresponding in size to the first and second liquid crystal cell areas are defined; and rubbing the second bare glass having the color filter in a second rubbing direction opposite to the first rubbing direction.

In another aspect, an in-plane switching liquid crystal display device includes: a first liquid crystal cell area that has a first size and a second liquid crystal cell area that has a second size on a first bare glass, wherein first longer sides of the first liquid crystal cell area runs in a first direction on the first bare glass and second longer sides of the second liquid crystal cell areas run in a second direction; array elements that include thin film transistors, common electrodes and pixel electrodes within the first and second liquid crystal cell areas of the first bare glass, wherein the common electrodes and pixel electrodes define concentric ring-shaped apertures; and a color filter layer on a second bare glass having liquid crystal cell areas corresponding in size to the first and second liquid crystal cell areas are defined.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the present invention and together with the description serve to explain the principles of that invention.

DETAILED DESCRIPTION OF THE ILLUSTRATED EMBODIMENTS

Reference will now be made in detail to an illustrated embodiment of the present invention, examples of which are shown in the accompanying drawings. Wherever possible, similar reference numbers will be used throughout the drawings to refer to the same or similar parts.

Figure 7:
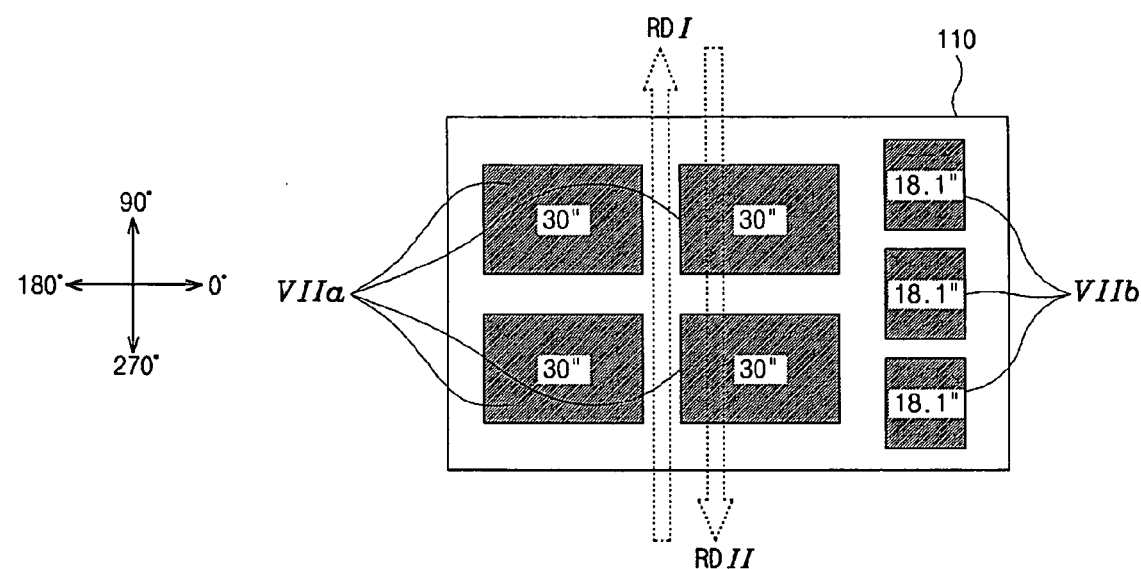
FIG. 7 is a diagram illustrating an MMG (Multi-Model on Glass) type arrangement of liquid crystal cells for use in an IPS-LCD device having a circular-shaped common electrode and a circular-shaped pixel electrode in accordance with the present invention.
Figure 8:
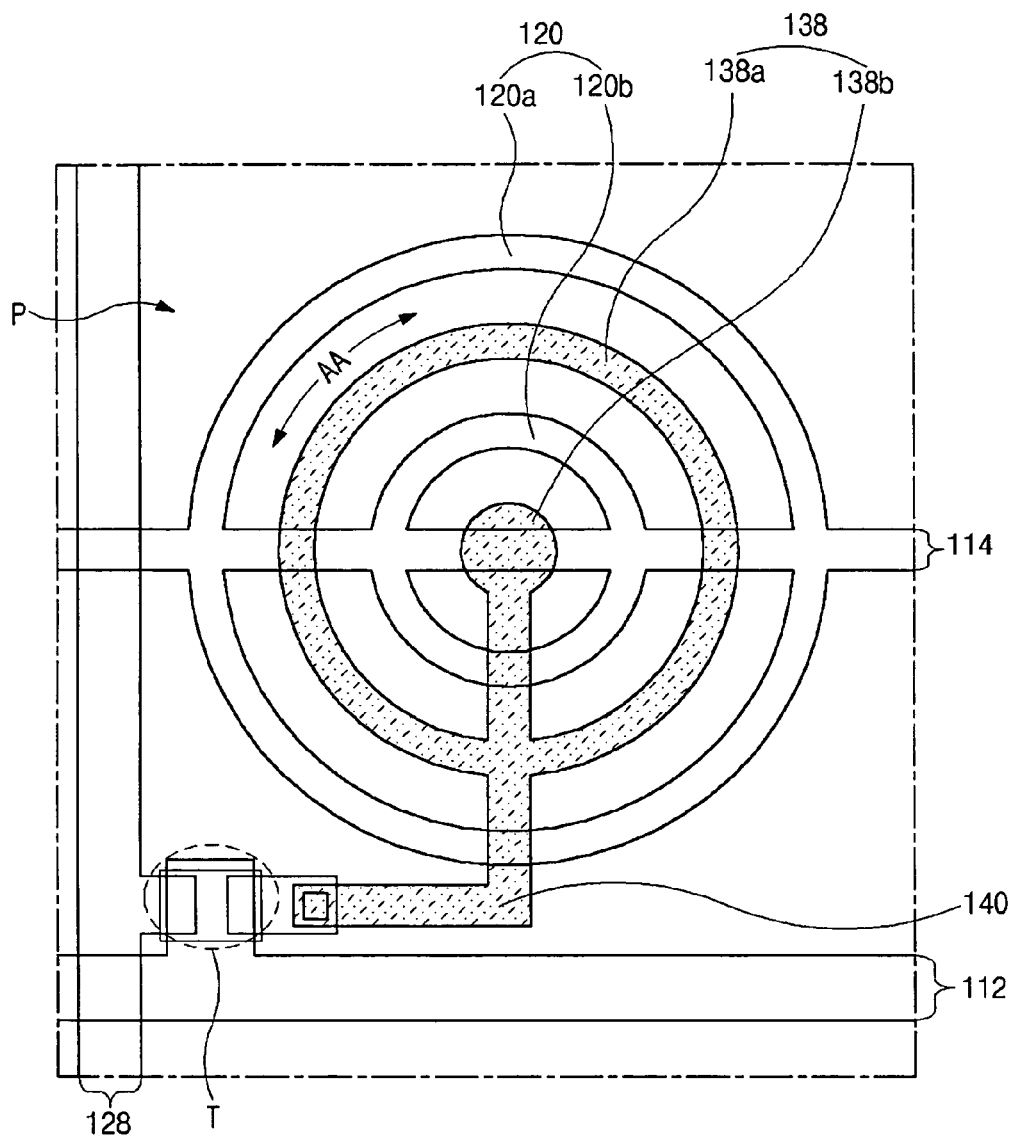
FIG. 8 is a plan view illustrating one pixel of an array substrate having a circular-shaped common electrode and a circular-shaped pixel electrode in accordance with the present invention.

FIG. 7 is a diagram illustrating an MMG (Multi-Model on Glass) type arrangement of liquid crystal cells for use in an IPS-LCD device having a circular-shaped common electrode and a circular-shaped pixel electrode in accordance with the present invention, and FIG. 8 is a plan view illustrating one pixel of an array substrate having a circular-shaped common electrode and a circular-shaped pixel electrode in accordance with the present invention. As shown in FIG. 7, a plurality of first liquid crystal cell areas VIIa, for example, 30 inches liquid crystal cells, are disposed on a bare glass 110. In addition, a plurality of second liquid crystal cell areas VIIb, for example, 18.1 inches liquid crystal cells, are also disposed on the bare glass 110. The 18.1 inches liquid crystal cells are located on the peripheral side of the bare glass 110.

Although not shown in FIG. 7 but shown in FIG. 8, the first and second liquid crystal cells include circular-shaped common electrodes 120 and circular-shaped pixel electrodes 138 in each of the pixels P. According to the present invention, since the common electrodes 120 and the pixel electrodes 138 are circular shaped, the rubbing direction defining the initial orientation of the liquid crystals can be in any direction. Although FIG. 7 shows first and second rubbing directions RDI and RDII that are longitudinal, the rubbing process can be conducted in one direction that can be in any direction. Unlike the straight electrode structure or zigzag electrode structure, the circular-shaped electrode structures do not limit the rubbing direction. This means that the degree of freedom is increased for arranging the first liquid crystal cell areas VIIa and the second liquid crystal cell areas VIIb.

Figure 1:
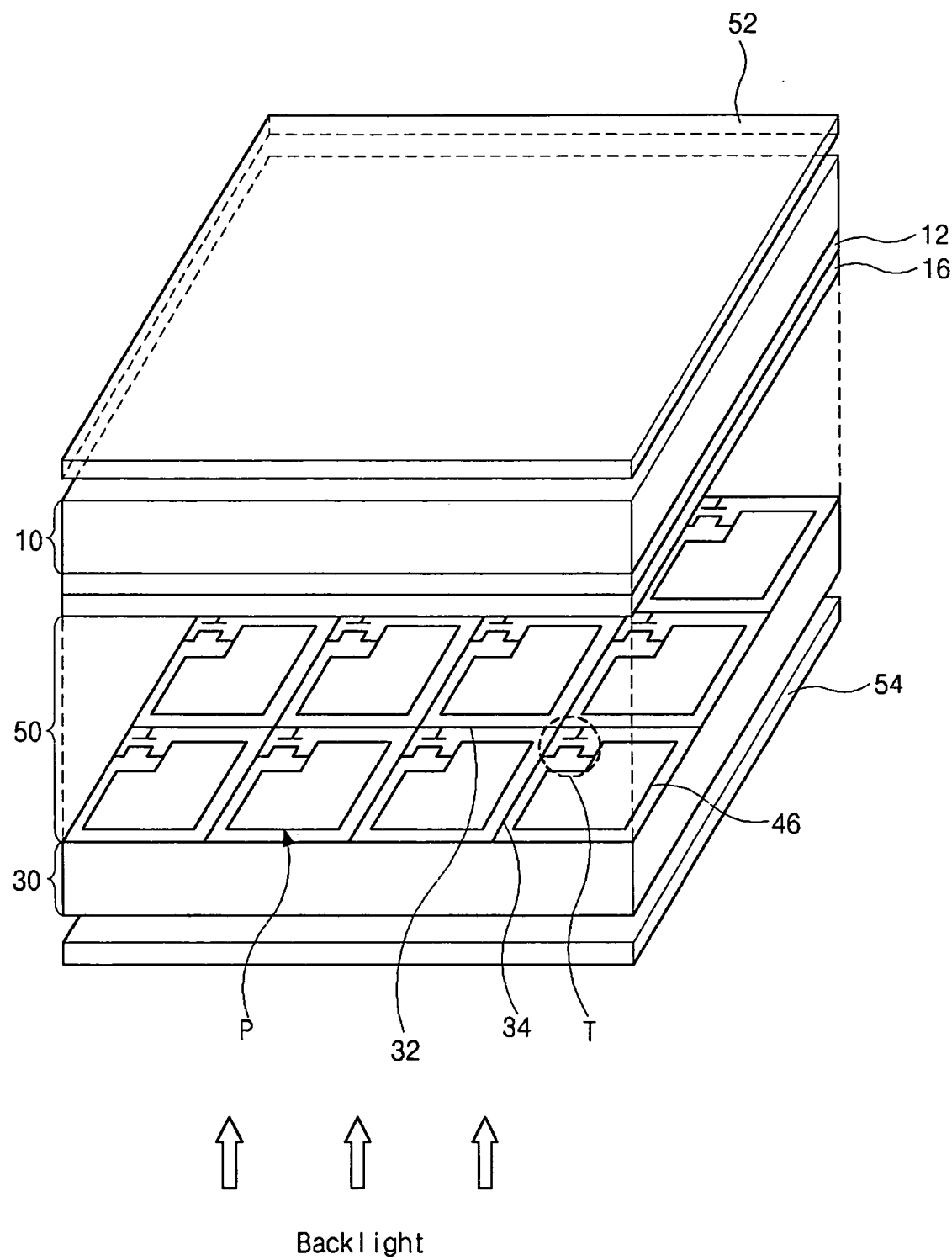
FIG. 1 is a partial perspective view illustrating a related art active matrix LCD device
Figure 2:
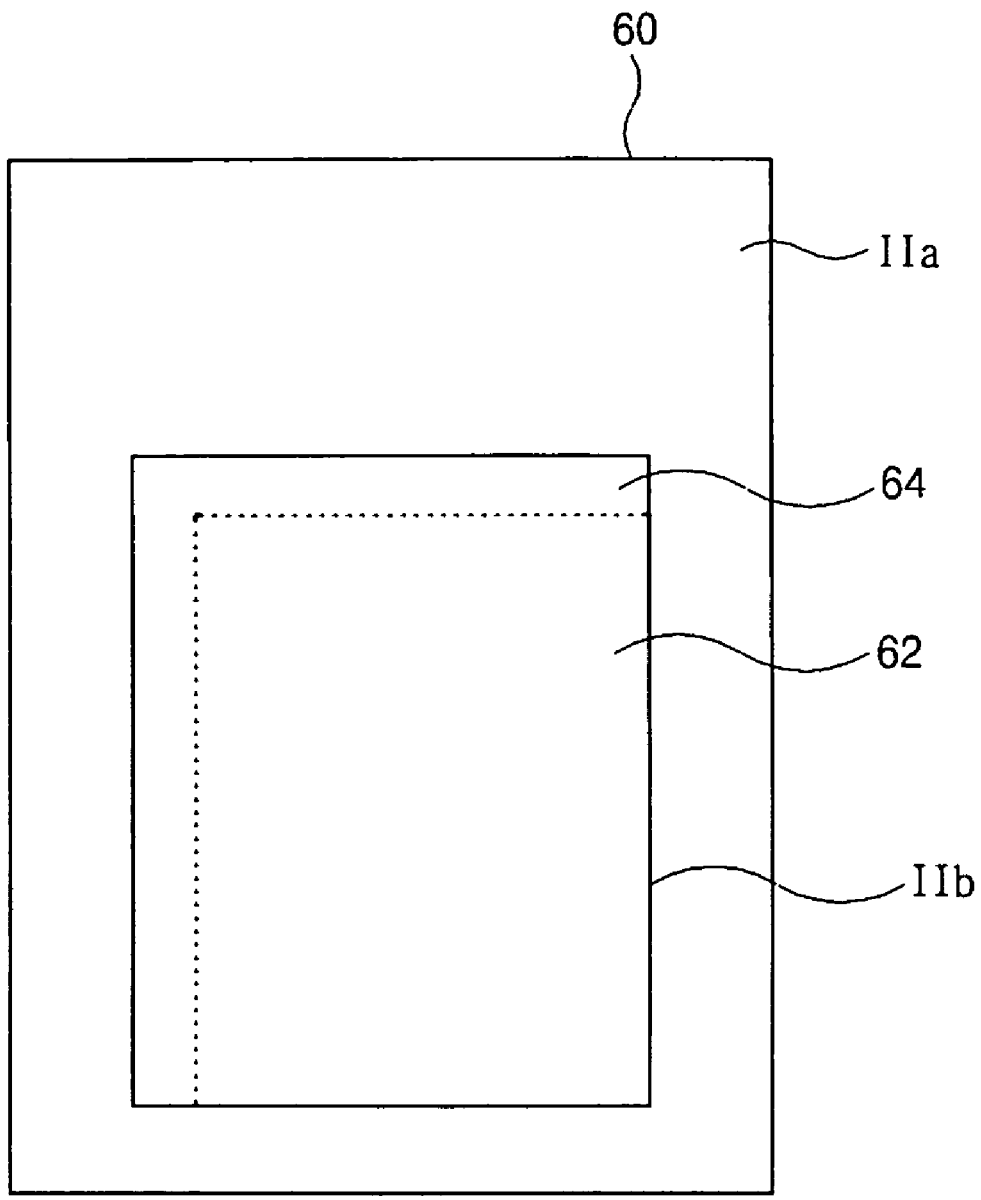
FIG. 2 is a plan view illustrating a liquid crystal cell arrangement on a bare glass
Figure 3:
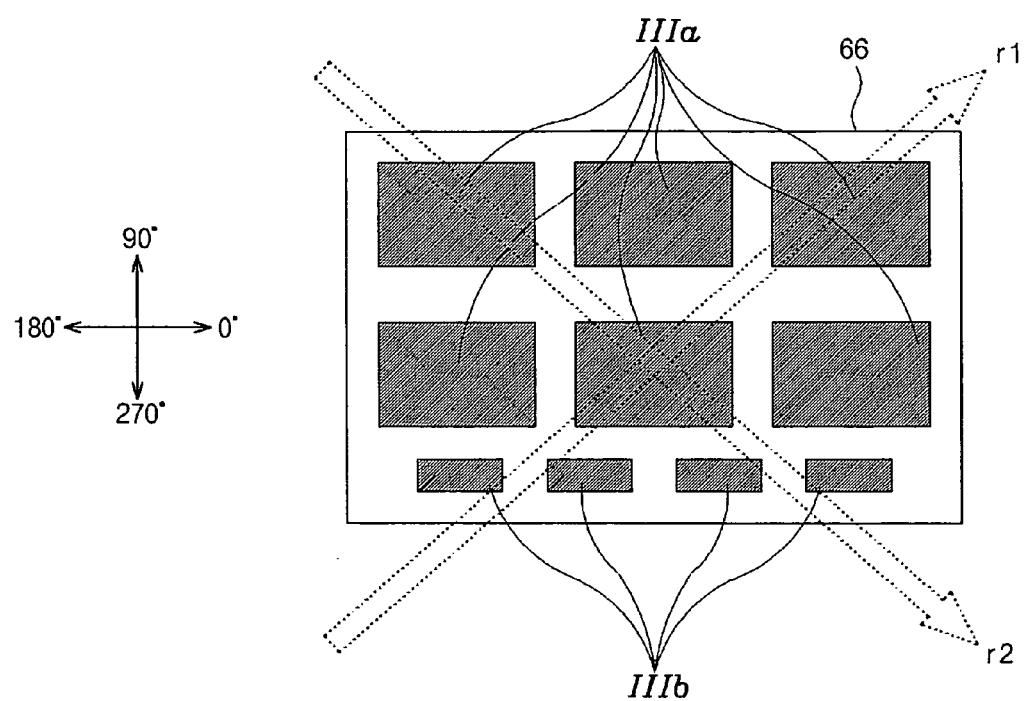
FIG. 3 is a diagram illustrating an MMG type arrangement of the liquid crystal cells for use in fabricating a TN (twisted nematic) mode liquid crystal display device according to a related art
Figure 4:
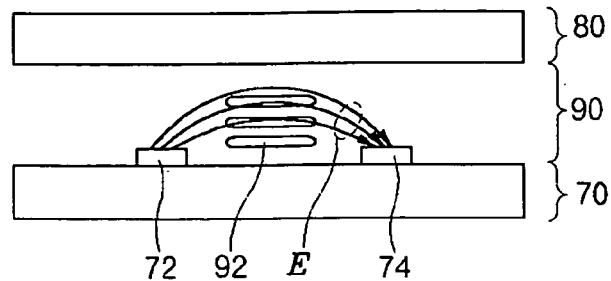
FIG. 4 is a cross-sectional view illustrating a concept of a related art IPS-LCD panel
Figure 5A:
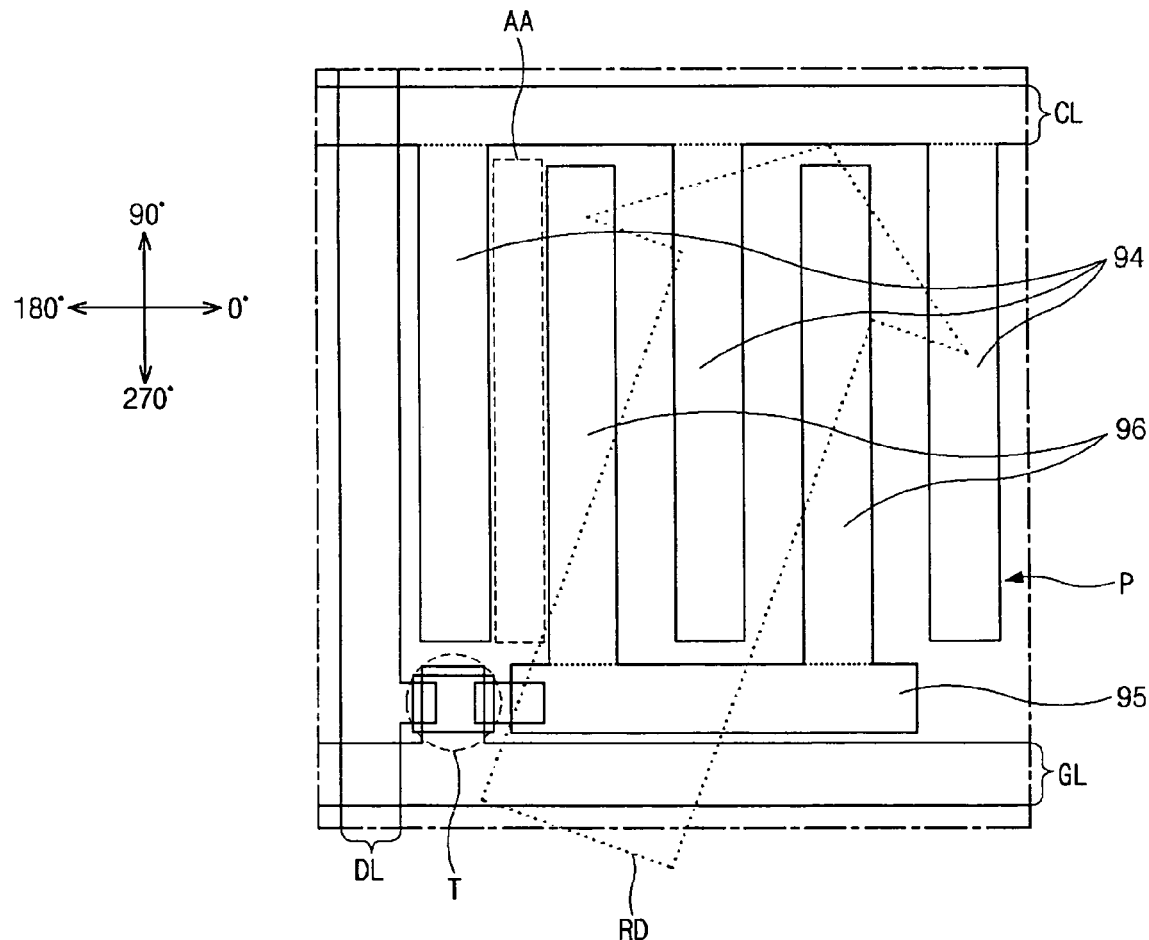
FIG. 5A is a plan view illustrating one pixel of an array substrate where strait pixel and common electrodes are disposed according to a related art IPS-LCD device
Figure 5B:
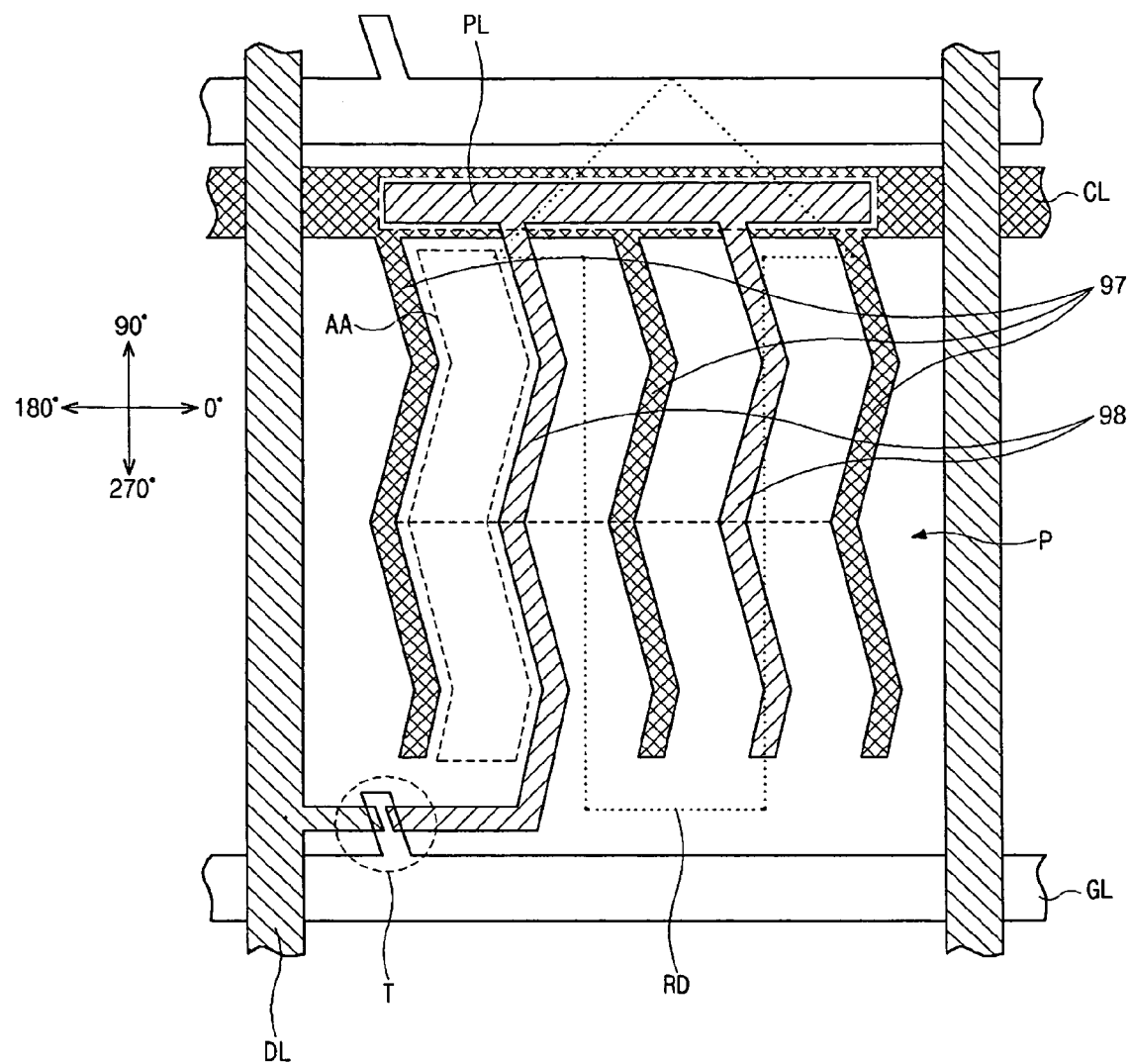
FIG. 5B is a plan view illustrating one pixel of an array substrate where zigzag pixel and common electrodes are disposed according to another related are IPS-LCD device
Figure 6:
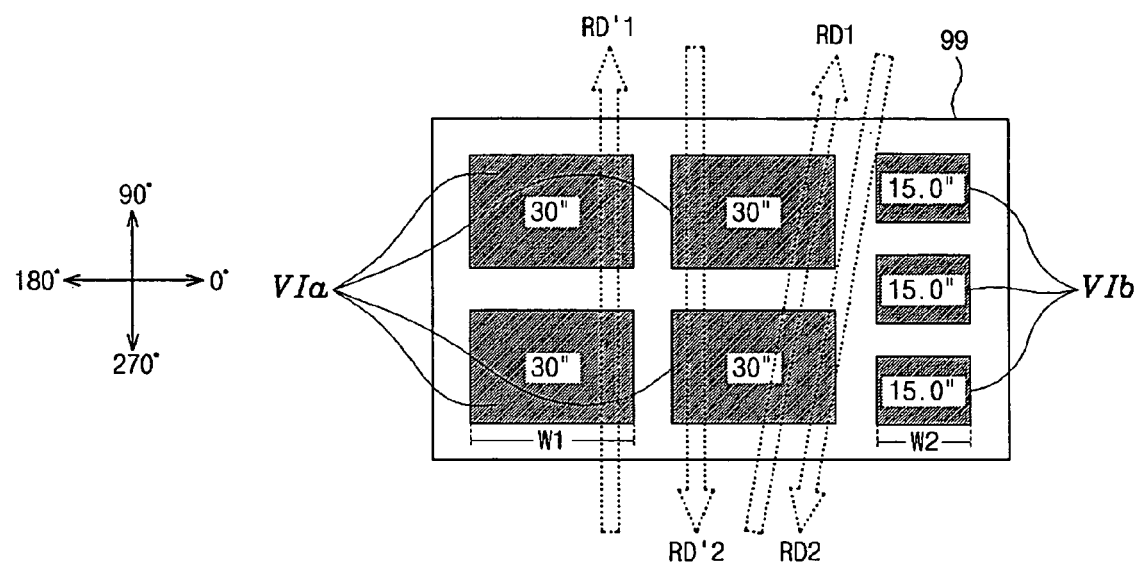
FIG. 6 is a diagram illustrating an arrangement of liquid crystal cells for use in fabricating an IPS-LCD device in accordance with the related art

In the related art shown in FIG. 6, the longer sides of the liquid crystal cells VIa and VIb are all arranged to run from left to right. However, in the present invention, although the longer sides of the first liquid crystal cells VIIa run from left to right, it is possible to arrange the second liquid crystal cells VIIb to make the longer sides run from top to bottom because there is no limitation in rubbing direction. For example, the 18.1 inches liquid crystal cells could not be arranged on the bare glass with the 30 inches liquid crystal cells because there was no spaces in the periphery for arranging the longer sides of the 18.1 inches liquid crystal cells to run from left to right. However, according to the present invention, the 18.1 inches liquid crystal cells can be arranged in peripheries of the bare glass 110 by way of arranging the longer sides to run from top and bottom because the present invention has no limitation on the rubbing direction. Accordingly, the spatial efficiency in arranging the different-sized liquid crystal cells can be increased according to the present invention.

In the present invention, the rubbing directions are not limited. Thus, it does not matter whether the rubbing process is conducted in a direction of 0, 45, 90, 135, 180, 225, 270 or 315 degrees. However, the first rubbing direction RDI applied to the bare glass for the array substrate should be opposite to the second rubbing direction RDII applied to the bare glass for the color filter substrate.

The circular-shaped electrode structures including ring-shaped common electrodes and ring-shaped pixel electrodes will be explained in detail with reference to FIG. 8. As shown in FIG. 8, a gate line 112 is transversely arranged across the figure and a data line 128 is disposed so as to be substantially perpendicular to the gate line 112. The gate line 112 and the data line 128 define a pixel region P on a substrate. A thin film transistor (TFT) T is disposed near the crossing of the gate line 112 and data line at a corner of the pixel region P. A common line 114 is transversely arranged across the middle of the pixel region P such that it is parallel with the gate line 112 and perpendicularly crosses the data line 128.

A first ring-shaped common electrode pattern 120a and a second ring-shaped common electrode pattern 120b are formed within the pixel region P. Half portions of each of the first common electrode pattern 120a and the second common electrode pattern extend from the common line 114 such that the common line 114 is connected to the first common electrode pattern 120a and the second common electrode pattern 120b along a diametric line of the circular-shaped electrode structures. The first ring-shaped common electrode pattern 120a is larger than the second circular common electrode pattern 120b such that the second ring-shaped common electrode 120b is disposed inside of the first ring-shaped common electrode pattern 120. The ring-shaped common electrode patterns 120a and 120b are spaced apart from each other, and constitute a common electrode 120 shaped like concentric rings.

A first pixel electrode pattern 138a and second pixel electrode pattern 138b are also formed within the pixel region P. The first pixel electrode 138a has a ring shape and is disposed between the first common electrode pattern 120a and second common electrode pattern 120b. The second pixel electrode 138b is shaped like a bullseye and is disposed inside the second circular common electrode pattern 120b. The first pixel electrode pattern 138a and second pixel electrode pattern 138b are connected by a pixel connecting line 140, and constitute a pixel electrode 138 shaped like bullseye with a concentric ring thereabout. The pixel connecting line 140 has an L-shape, for example, and connects to the thin film transistor T.

In the present invention illustrate with reference to FIG. 6, aperture areas "AA" are defined between the common electrodes 120 and the pixel electrodes 138 that are shaped like concentric rings. Thus, the liquid crystal director is the same in all directions such that much wider viewing angle can be obtained. Furthermore, since the ring-shaped common electrodes 120 and the ring-shaped pixel electrodes 138, forming a bullseye with concentric rings in which the common and pixel electrode alternate, are utilized in the pixel, the liquid crystal cells VIIa and VIIb of FIG. 7 having such pixels can be arranged more efficiently on the bare glass since the rubbing direction is not limited. Therefore, the dummy area removed during the cutting process can be reduced in the MMG type arrangement. Namely, the bare glass can be more effectively used so as to reduce cost and material waste. Further, the degree of freedom increases in designing the MMG type arranging bare glass.

Figure 9:
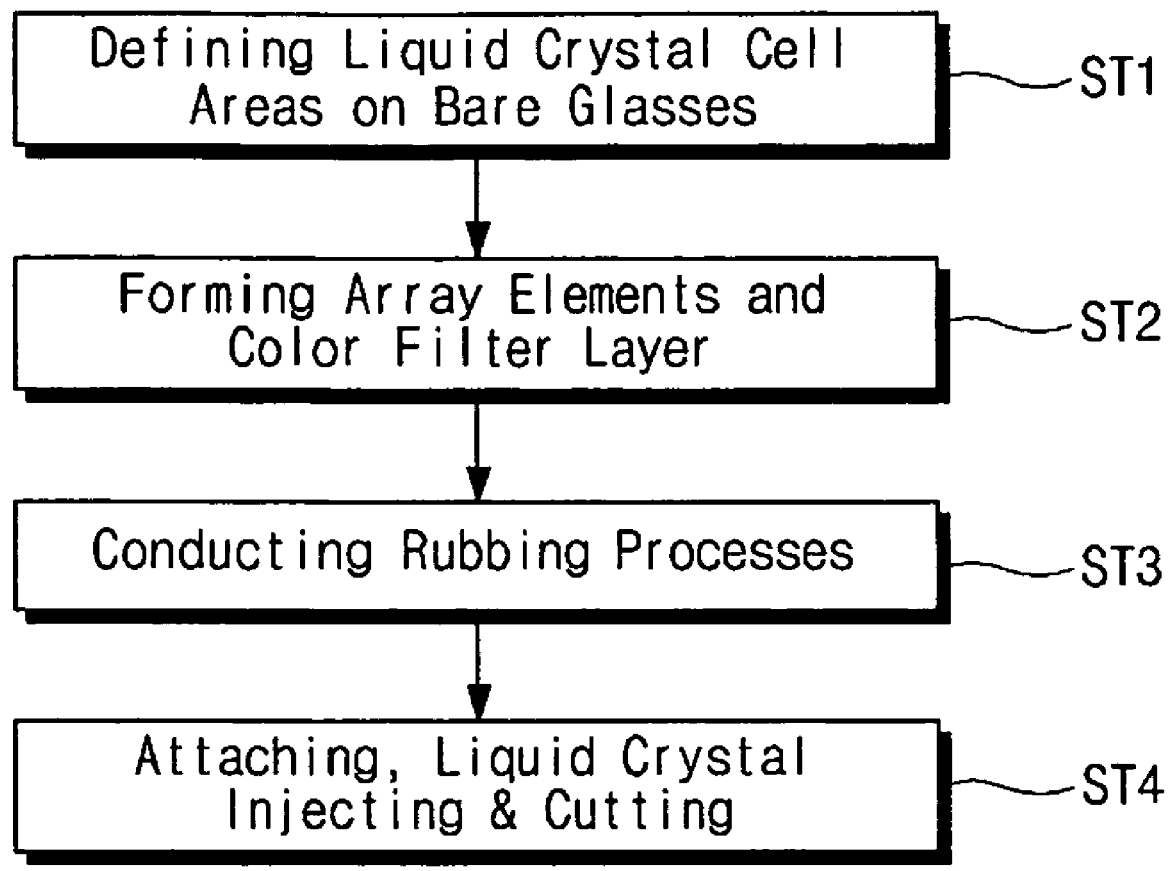
FIG. 9 is a flow chart illustrating liquid crystal cell process steps for used in forming an IPS-LCD device.

FIG. 9 is a flow chart illustrating liquid crystal cell process steps for used in forming an IPS-LCD device. In the initial step ST1, a plurality of first liquid crystal cell areas, each having a first size, and a plurality of second liquid crystal cell areas, each having a second size, are defined on a first bare glass. The first size of the first liquid crystal cell is larger than the second size of the second liquid crystal cell. The longer sides of the first liquid crystal cells run from left and right on the first bare glass, but the longer sides of the second liquid crystal cells can run both from left and right and from top and bottom. Each of the first and second liquid crystal cell areas is divided into a first portion where a plurality of array elements will be disposed and a second portion where a plurality of pads and driving circuitries will be disposed. At this time, a plurality of liquid crystal cell areas each corresponding in size to the first and second liquid crystal cell areas are also defined on a second bare glass. A color filter layer will be formed in the liquid crystal cell areas defined on the second bare glass.

In step ST2, a plurality of array elements including thin film transistors and circular-shaped common and pixel electrodes are formed in the first and second liquid crystal cell areas of the first bare glass. Since the common and pixel electrodes are configured to be like a bullseye with concentric rings, aperture areas are defined between the common and pixel electrodes that are shaped like concentric rings. Thus, the liquid crystal director can be distributed uniformly in all directions. At this time, the color filter layer is formed in the liquid crystal cell areas of the second bare glass.

In step ST3, rubbing processes are conducted on the first and second bare glasses, respectively, to induce initial directions of the liquid crystals. As described hereinbefore, since the circular-shaped common electrodes and the circular-shaped pixel electrodes are formed on the first bare glass, the rubbing directions are versatile in all directions. However, a first rubbing direction applied to the first bare glass should be opposite to a second rubbing direction applied to the second bare glass.

In step ST 4, the first and second bare glasses are aligned and attached to each other to form the liquid crystal cells. Thereafter, the liquid crystals are injected in the liquid crystal cells between the attached first and second bare glasses. Then, a cutting process is conducted along outer lines of the liquid crystal cell areas such that the plurality of liquid crystal panels are finally formed. After forming the liquid crystal panel, polarizers are adhered to the outer surfaces of the liquid crystal panel.

According to the present invention, since the common electrodes and pixel electrodes have circular-shaped structures that form a bullseye with concentric rings in which the common and pixel electrodes alternate in the pixels of the liquid crystal cells, the rubbing direction can be in any direction regardless of how the liquid crystal cells are arranged on the bare glass. Therefore, the degree of freedom increases when designing the MMG type arrangement for use in the IPS-LCD device. Furthermore, the spatial availability of the bare glass will increase because the differently sized liquid crystal cells can be freely arranged on the bare glass regardless the rubbing direction. Thus, the present invention reduces the cost of products and increases the yield.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A process for forming an in-plane switching liquid crystal display device, comprising:

defining a first liquid crystal cell area that has a first size and a second liquid crystal cell area that has a second size on a first bare glass, wherein first longer sides of the first liquid crystal cell area run in a first direction on the first bare glass and second longer sides of the second liquid crystal cell areas run in a second direction;

forming array elements that include a gate line, a data line, a common line, a thin film transistor, a common electrode, and a pixel electrode within the first and second liquid crystal cell areas of the first bare glass, wherein the common electrode and the pixel electrode define concentric ring-shaped apertures with the common electrode connected to the common line and the pixel electrode overlapping the common line;

rubbing the first bare glass having the array elements in a first rubbing direction;

forming a color filter layer on a second bare glass wherein liquid crystal cell areas corresponding in size to the first and second liquid crystal cell areas are defined; and rubbing the second bare glass having the color filter in a second rubbing direction opposite to the first rubbing direction, wherein the common electrode includes a first ring-shaped common electrode pattern and a second ring-shaped common electrode pattern such that respective half portions of both the first and the second ring-shaped common electrode patterns extend from the common line in opposite directions, and wherein the pixel electrode includes a ring-shaped pixel electrode pattern between the first and second ring-shaped common electrode patterns, and a bullseye-shaped pixel electrode pattern inside the second ring-shaped common electrode pattern such that both the ring-shaped pixel electrode pattern and the bullseye-shaped pixel electrode pattern overlap the common line.

2. The process of claim 1, wherein the first rubbing direction is one of 0, 45, 90, 135, 180, 225, 270 and 315 degrees.

3. The process of claim 1, wherein the first size is larger than the second size.

4. The process of claim 1, wherein the first direction is from left to right and the second direction is from top and bottom on the first bare glass.

5. The process of claim 1, wherein the first direction is parallel with the second direction.

6. The process of claim 1, wherein the forming the array elements includes forming the gate line horizontally, the data line longitudinally and the common line parallel with the gate line.

7. The process of claim 6, wherein the gate line and data line cross each other and define a pixel region.

8. The process of claim 7, wherein the array elements are disposed within the pixel region.

9. The process of claim 6, wherein the common electrode includes a first ring-shaped common electrode pattern and a second ring-shaped common electrode pattern, and half portions of both first and second ring-shaped common electrode patterns extend from the common line in opposite directions.

10. The process of claim 9, wherein the second ring-shaped common electrode pattern is smaller than the first ring-shaped common electrode pattern and is disposed inside the first ring-shaped common electrode pattern.

11. The process of claim 10, wherein the pixel electrode includes a ring-shaped pixel electrode pattern between the first and second ring-shaped common electrode patterns, and a bullseye-shaped pixel electrode pattern inside the second ring-shaped common electrode pattern.

12. The process of claim 11, wherein the pixel electrode is connected to the thin film transistor through a pixel connecting line that connects the ring-shaped circular pixel electrode to the bullseye-shaped pixel electrode.

13. An in-plane switching liquid crystal display device, comprising:
  a first liquid crystal cell area that has a first size and a second liquid crystal cell area that has a second size on a first bare glass, wherein first longer sides of the first liquid crystal cell area run in a first direction on the first bare glass and second longer sides of the second liquid crystal cell areas run in a second direction;
  array elements that include a gate line, a data line, a common line, a thin film transistor, a common electrode, and a pixel electrode within the first and second liquid crystal cell areas of the first bare glass, wherein the common electrode and the pixel electrode define concentric ring-shaped apertures with the common electrode connected to the common line and the pixel electrode overlapping the common line; and
  a color filter layer on a second bare glass having liquid crystal cell areas corresponding in size to the first and second liquid crystal cell areas are defined,
  wherein the common electrode includes a first ring-shaped common electrode pattern and a second ring-shaped common electrode pattern such that respective half portions of both the first and the second ring-shaped common electrode patterns extend from the common line in opposite directions, and
  wherein the pixel electrode includes a ring-shaped pixel electrode pattern between the first and second ring-shaped common electrode patterns, and a bullseye-shaped pixel electrode pattern inside the second ring-shaped common electrode pattern such that both the ring-shaped pixel electrode pattern and the bullseye-shaped pixel electrode pattern overlap the common line.

14. The device of claim 13, further comprising:
  a plurality of first liquid crystal cell areas running in the first direction, wherein the first longer sides of the plurality of first liquid crystal cell area run in the first direction; and
  a plurality of second liquid crystal cell areas running in the second direction, wherein second longer sides of the plurality of second liquid crystal cell areas run in the second direction.

15. The device of claim 13, wherein the first size is larger than the second size.

16. The device of claim 13, wherein the common electrode includes a first ring-shaped common electrode pattern and a second ring-shaped common electrode pattern, and half portions of both first and second ring-shaped common electrode patterns extend from the common line in opposite directions.

17. The device of claim 16, wherein the second ring-shaped common electrode pattern is smaller than the first ring-shaped common electrode pattern and is disposed inside the first ring-shaped common electrode pattern.

18. The device of claim 17, wherein the pixel electrode includes a ring-shaped pixel electrode pattern between the first and second ring-shaped common electrode patterns, and a bullseye-shaped pixel electrode pattern inside the second ring-shaped common electrode pattern.

19. The device of claim 18, wherein the pixel electrode is connected to the thin film transistor through a pixel connecting line that connects the ring-shaped circular pixel electrode to the bullseye-shaped pixel electrode.

20. The device of claim 13, wherein the gate line is disposed horizontally, the data line is disposed longitudinally and the common line is disposed parallel with the gate line.

* * * * *